May 19, 1964 F. E. BROWN 3,133,679
LIQUID DISPENSING DEVICE
Filed April 5, 1961 3 Sheets-Sheet 1
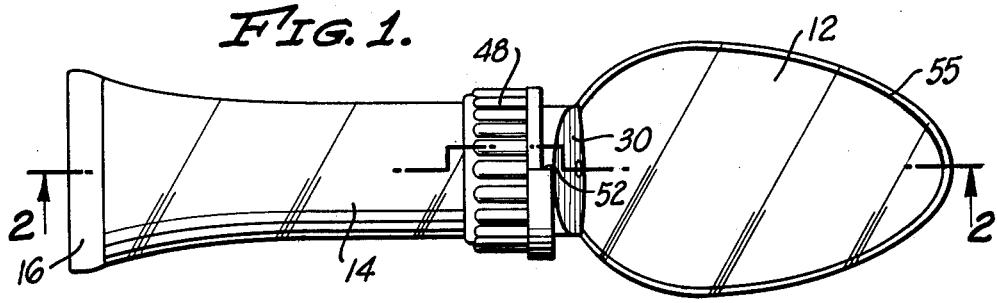
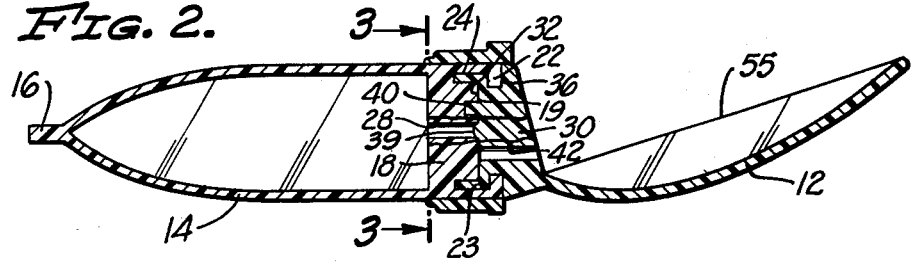
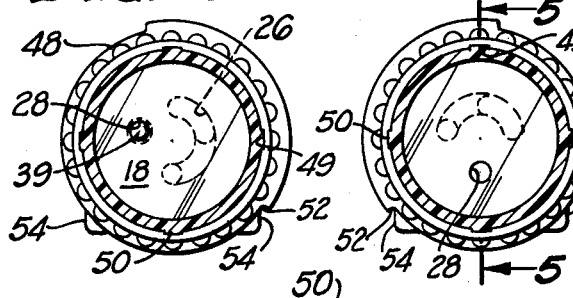 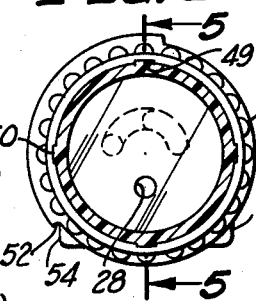 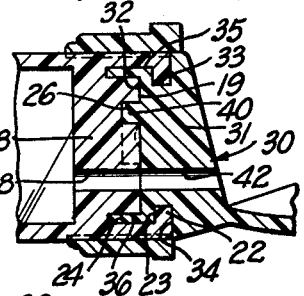
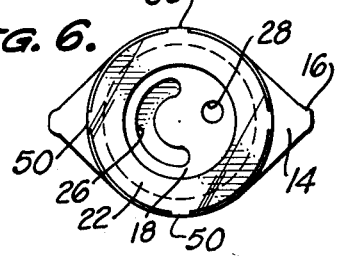 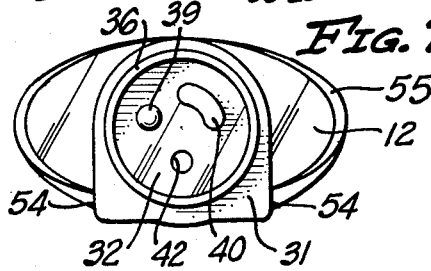
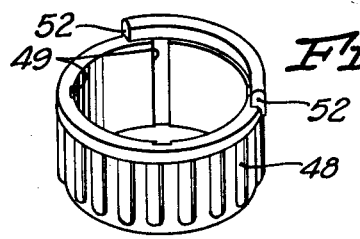
INVENTOR
FRANK E. BROWN
BY HIS ATTORNEYS
HARRIS, KIECH, RUSSELL & KERN

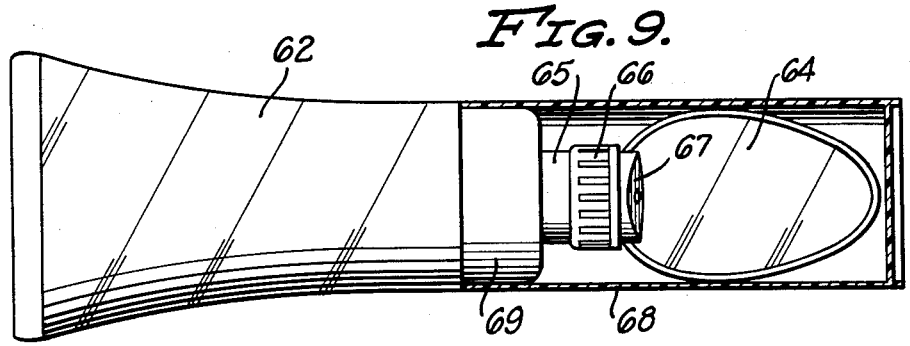
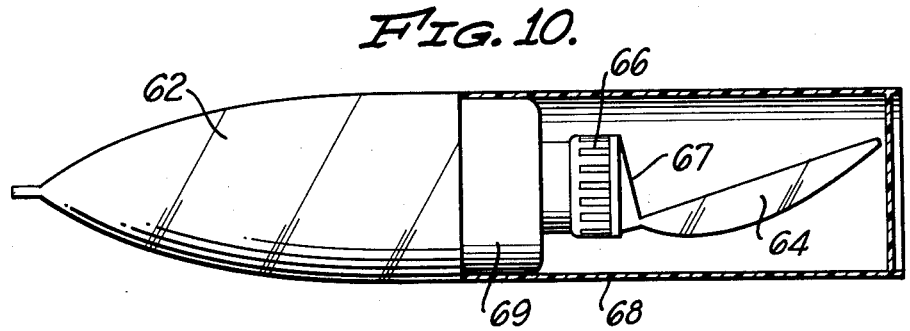
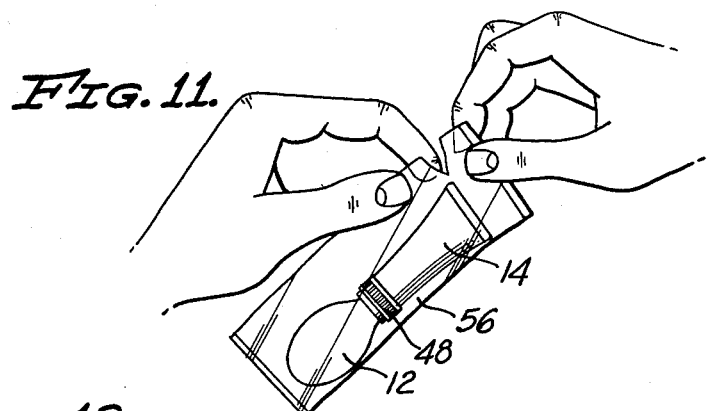
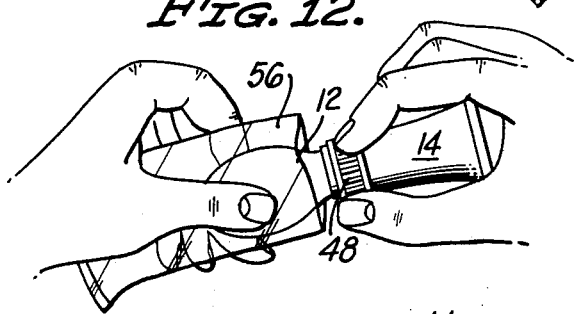
INVENTOR
FRANK E. BROWN
BY HIS ATTORNEYS
HARRIS, KIECH, RUSSELL & KERN May 19, 1964 F. E. BROWN 3,133,679
LIQUID DISPENSING DEVICE
Filed April 5, 1961 3 Sheets-Sheet 3
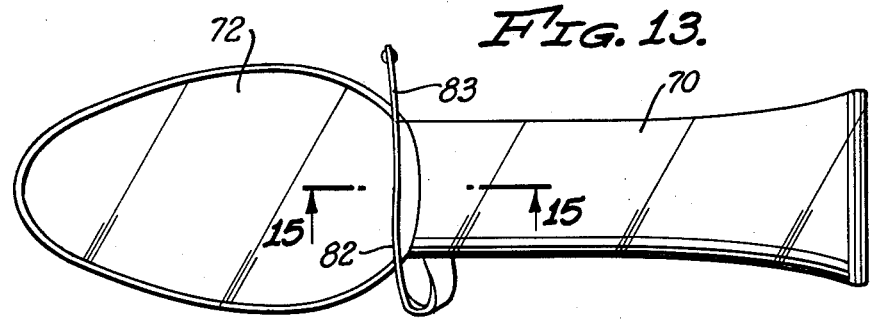
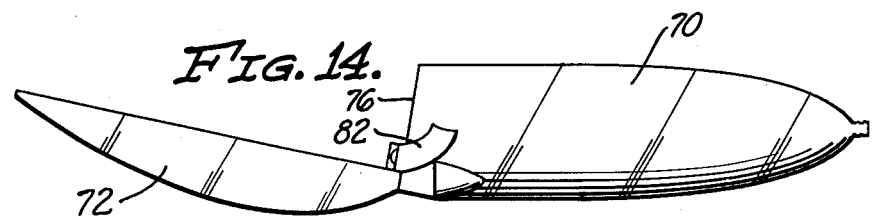
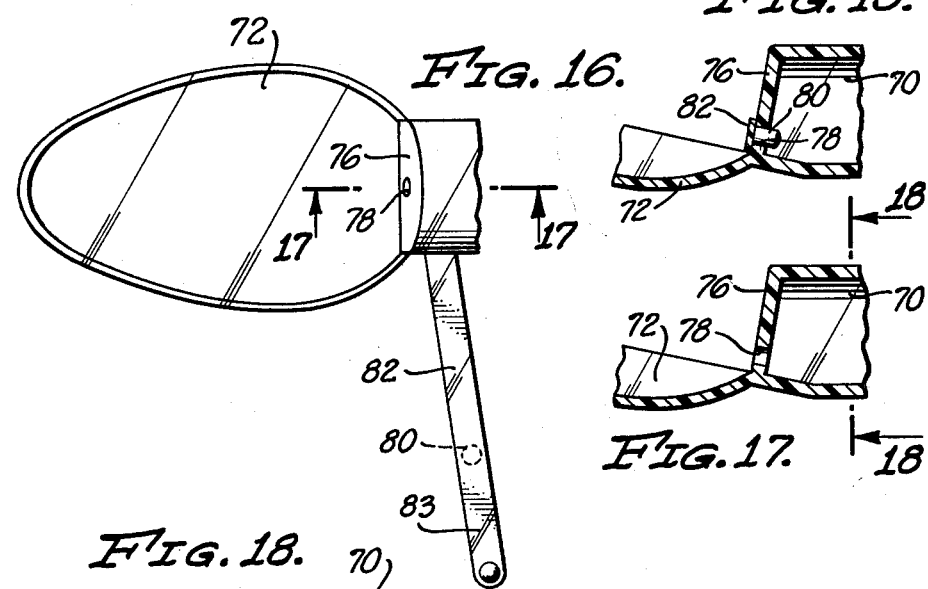
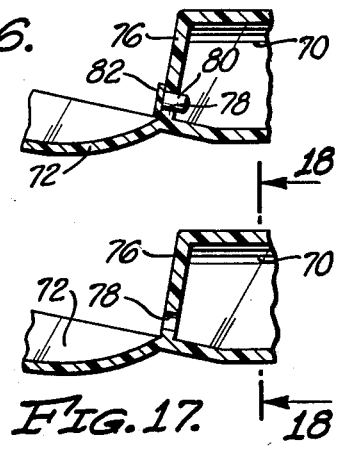
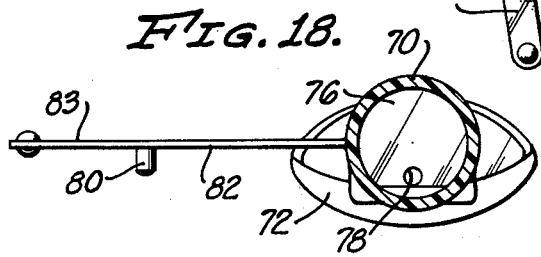
INVENTOR
FRANK E. BROWN
BY HIS ATTORNEYS
HARRIS, KIECH, RUSSELL & KERN

United States Patent Office 3,133,679
Patented May 19, 1964

3,133,679
LIQUID DISPENSING DEVICE
Frank E. Brown, 1842 Emerald Terrace,
Glendale 1, Calif.
Filed Apr. 5, 1961, Ser. No. 100,830
7 Claims. (Cl. 222—205)

This invention relates to a liquid dispensing device of the type particularly suitable for the dispensing of a sample of a product although it also has uses in the dispensing of measured doses of a product to be taken orally.

Pharmaceutical houses employ a number of salesmen commonly known as detail men who call upon physicians for the purposes of acquainting the physicians with available proprietary medical products and to introduce new drugs. It is common practice for the physician or his nurse to sample taste the new product, since a product to be accepted by the public must have a satisfactory flavor.

It is also common practice for the detail man to leave with the physician, a bottle or two of the new product and a supply of disposable plastic spoons. It is apparent that this old method of introducing a product is clumsy and not as fully sanitary as would be desired. The improved liquid dispensing device of the invention permits the dispensing of the product in individual portions and in a far more sanitary fashion.

It is an object of the invention to provide a liquid dispensing device including a spoon member supported by a flexible tubular handle formed of pliable, plastic material such as, for example, a polyethylene or a pliable vinyl plastic. The liquid product is contained within the flexible tubular handle and is dispensed into the spoon member through an aperture at the spoon end of the tubular handle. It is an object of the invention to provide such a structure, also to provide means for closing and opening the aperture.

It has been found important that the aperture be properly positioned with respect to the spoon member to promote substantially complete emptying of the liquid from the tubular handle. If the aperture opens into the spoon below the plane to which the liquid is normally filled, it has been found that release of pressure on the flexible tubular handle results in drawing back into the handle some of the material previously expelled into the spoon member. It is an object of the invention to dispose the aperture above the plane to which the spoon member is filled when in substantially horizontal filling position. It is a further important object to mount the tubular handle at a slight angle with respect to the plane of the top edge of the spoon.

In one form of the invention the spoon member and the handle are molded integrally of the same pliable plastic material. The closing means in this embodiment may conveniently take the form of a plug carried by a flexible strap made of the same plastic material and formed integrally with the remainder of the structure. It is an object of the invention to provide such a combination.

In another embodiment of the invention the spoon member is rotatably supported by the pliable tubular handle. It is an object of the invention to provide such a structure and to provide for opening and closing of the aperture upon relative rotation of the spoon member and the tubular handle.

A particularly sturdy form of the invention includes a pliable plastic tube of circular cross section which is collapsed and sealed at one end to provide a closure, the other end of the tube being closed by a partition or diaphragm extending across the width of the tube. The spoon member provides a circular wall insertable into and rotatable within a circumferential channel at the forward end of the tube, this circular wall and the partition or diaphragm having openings transverse thereto which can be brought into and out of registry by relative rotation of the spoon member and the tube. It is an object of the invention to provide such a structure.

Another object of the invention is to provide for effective sealing of the hole in the partition, also to provide a stop means adjacent the partition limiting the relative rotation of the spoon member.

Another object of the invention is to provide a binding ring locking the spoon member relative to the tube and preventing such expansion of the pliable tube member as would permit release of the spoon member. A further object is to provide supplemental stop means coming into operation because of the presence of such binding ring.

The foregoing objects and advantages of the invention, together with various other objects and advantages will become evident to those skilled in the art in light of the following disclosure and drawings. The drawings illustrate and the disclosure describes preferred embodiments of the apparatus of the present invention.

In the drawings:

FIG. 1 is a plan view of a preferred embodiment of a liquid dispensing device of the invention, illustrating a spoon member supported at the forward end of a flexible tubular handle;

FIG. 2 is a longitudinal sectional view taken along a line 2—2 of FIG. 1, illustrating in further detail the manner of supporting the spoon member;

FIG. 3 is a cross-sectional view taken along line 3—3 of FIG. 2, showing the device in its closed position;

FIG. 4 is another cross-sectional view from the general site of line 3—3 of FIG. 2, but with the device rotated to its open position;

FIG. 5 is a sectional view taken along line 5—5 of FIG. 4, illustrating the aperture leading from the interior of the tube in its open position;

FIG. 6 is an end view of the flexible tubular handle portion of the device with the spoon member removed therefrom;

FIG. 7 is another end view looking in the general direction of the line 3—3 of FIG. 2 with the tubular handle removed, showing the details of the supporting structure of the spoon member;

FIG. 8 is an isometric view of a binding ring for holding the flexible tubular handle in tight engagement against the supporting structure of the spoon member;

FIG. 9 is a plan view, partially cut away, of another form of the liquid dispensing device of the invention especially designed for holding larger quantities of liquid, which form is provided with a special type of closure for the spoon member;

FIG. 10 is a side elevational view of the device of FIG. 1, again partially cut away;

FIG. 11 is an illustration of a preferred way of packaging the dispensing device of FIGS. 1–8 in a transparent envelope;

FIG. 12 illustrates the manner in which the packaged dispensing device of FIG. 11 may be actuated to open the tubular handle to liquid flow without directly touching the spoon member with the hand;

FIG. 13 is a plan view of still another form of the liquid dispensing device of the invention, which form has an integrated structure of spoon member and tubular handle;

FIG. 14 is a side elevational view of the dispensing device of FIG. 13;

FIG. 15 is a fragmentary cross-sectioanl view along line 15—15 of FIG. 13 illustrating the details of the plug closing the aperture connecting the tubular handle and spoon member;

FIG. 16 is a fragmentary plan view showing the stopper and its flexible strap carrier in open position;

FIG. 17 is a cross-sectional view taken along the line 17—17 of FIG. 16, showing the aperture open and illustrating its orientation with respect to the spoon member; and FIG. 18 is a sectional view taken along line 18—18 of FIG. 17.

The liquid dispensing device of FIGS. 1–8 is formed of a spoon member 12 with its rear end rotatably supported adjacent the forward end of a squeezable, dosage-containing tubular handle 14. The tubular handle 14 is made of a pliable plastic such as polyethylene or pliable vinyl plastic with the tube portion of the handle being collapsed at one end to provide a closure 16. The closure may be made by application of heat or suitable adhesive to effect a seal that will not rupture upon increased internal pressure resulting from squeezing the tube portion. When the polyethylene is used as a material for the tubular handle the latter may be conveniently closed by heat sealing to form the closure 16 at the end of the tubular handle. Where vinyl plastic is used, closing may be achieved through electronic welding. The plastic tube will normally be closed after filling with the liquid to be dispensed.

The tubular handle 14 at its other end is provided with an integrally molded partition or diaphragm 18 of some thickness extending widthwise of the tube and providing a forward face 19. It will be noted that the partition 18 is spaced inwardly a small distance from the forward end of the tube. The tubular handle 14 at its forward end is provided with a circular inwardly extending lip 22, best seen in FIG. 2, spaced forwardly of the forward face 19 to provide therebetween an inwardly facing arcuate groove 23. A recessed circumferential channel 24 (see FIG. 2) is preferably molded in the forward face of the partition or diaphragm 18. Radially inwardly of this channel 24 is molded an arcuate groove 26 (FIG. 6). The partition or diaphragm 18 also has a small through hole or aperture 28 extending longitudinally of the tubular handle 14 and displaced from the central axis thereof.

The spoon member in this embodiment is preferably formed of a relatively more rigid material than the tube, such as polystyrene. It provides at its rear end a supporting structure 30 (see FIG. 2) which serves to attach the spoon to the plastic tubular handle 14. The supporting structure 30 is a part of a head 31 adapted to turn relative to the tubular handle 14 with its rear face 32 in surface engagement with the forward face 19 of the diaphragm 18. The head 31 provides a peripheral groove 33 receiving the inwardly extending lip 22, this groove being bounded forwardly by a radial wall 34 which slidably engages the forward face of such inwardly extending lip. The groove 33 is bounded rearwardly by a circular wall 35 sized to turn in the inwardly facing arcuate groove 23. A circumferential lip 36 is integral with the circular wall 35 and extends rearward from the periphery, being sized to turn in the recessed circumferential channel 24. The resilient material of the tubular handle 14 can stretch to receive the circular wall 35 and the circumferential lip 36, this material thereafter contracting into the position shown in FIGS. 2 and 5 to dispose the inwardly extending lip 22 in the peripheral groove 33 and thus mount the head 31 of the spoon member to turn in the socket means of the tubular handle provided by the arcuate groove 23 and the recessed circumferential channel 24. The engaging surfaces of the head 31 and such socket means frictionally retard such turning movement and retain the spoon member 12 and the tubular handle 14 in adjusted relative position until one is manually turned relative to the other in a manner to be described. Normally such retention is achieved in part by making the outside dimension of the circumferential lip 36 slightly larger than the inside diameter of the outer wall of the recessed circumferential channel 24 into which it is fitted.

Molded or otherwise formed through the head 31 is a hole or aperture 38 disposed at the same radius as the aperture 28 of the diaphragm 18 so as to be moved into registry therewith when the tubular handle 14 and the spoon member 12 are in an "open" position. Conversely, the apertures 28 and 38 move out of registry when the tubular handle and spoon member are in a "closed" position. These relative positions of the tubular handle and spoon member are determined by the stop means to be described. Acting to some extent in this latter function but primarily to effect a more positive closure of the aperture 28 is a dimple-like projection 39 (FIG. 7) protruding slightly in a rearward direction from the rear face 32 of the head 31. This projection lies at the same radius as the apertures 28 and 38 but is spaced circumferentially from the latter so as to drop into the forward end of the aperture 28 when the tubular handle and spoon member are relatively rotated to the closed position. Upon relative rotation toward open position the dimple-like projection 39 is unsealed from the aperture and rides along the forward face 19 of the diaphragm 18.

The limits of the relative turning of the tubular handle 14 and the spoon member between such open and closed positions are further determined by an arcuate projection 40 extending from the rear face 32 of the head 31 into the arcuate groove 26 of the diaphragm 18. This arcuate projection is of smaller circumferential dimension than the arcuate groove 26 and thus acts as a stop means restricting the relative movement of the tubular handle and spoon member to movement between the aforesaid open and closed positions. It will be noted as best seen in FIG. 7 that the dimple-like projection 39, the aperture 38 and the arcuate projection 40 all lie on a common circle with respect to the center of the head 31. Similarly the arcuate groove 26 and the aperture 28 are located on a common circle (see FIG. 6) with respect to the center of the diaphragm 18 and with respect to the longitudinal axis of the tubular handle 14.

To lock the rear elements of the head 31 in the socket of the tubular handle to prevent any possibility of expansion of the latter sufficient to release its grip on the head 31 upon building up of internal pressure in the tubular handle due to squeezing I prefer to provide a binding ring 48 shown in detail in FIG. 8. This is normally displaced rearward along the tubular handle from its confining position shown in FIGS. 2 and 5 being forced forwardly into the latter position when the rear elements of the head 31 are in the aforesaid socket means. This binding ring is preferably made of relatively rigid plastic material and preferably provides internal grooves 49 (FIG. 8) into which correspondingly positioned ribs 50 (FIG. 4) of the tubular handle 14 extend to prevent relative rotation between the tubular handle and the binding ring.

As best seen in FIG. 8 the binding ring 48 has an outer knurled surface and is provided with a pair of spaced shoulders 52 (FIG. 8) that respectively engage stop surfaces 54 of the head 31 of the spoon member supporting structure 30 to limit relative rotation of the spoon member and the plastic tubular handle 14. The motion limiting feature of the binding ring 48 reinforces the motion limiting arrangement of the arcuate groove 26 and the arcuate projection 40 in the event a violent twisting force is applied to the device.

In this embodiment of the invention the internal volume of the tubular handle 14 or the liquid therein is preferably about equal to the volume of the spoon portion of the spoon member 12. Whether or not this relation exists it is very desirable to provide for the substantially complete expulsion of such liquid. Several factors aiding this objective are set forth in the following paragraphs.

First, the relationship of the forwardly opening aperture 42 of the head 31 with reference to the spoon proper is an important feature of the device of the invention. It will be noted that the aperture 42 opens into the spoon above the plane to which the spoon portion is filled, the exit being preferably above the plane of the upper lip 55 of such spoon portion when such upper lip is horizontal. When thus positioned the expelled liquid drops from the exit or forward end of the aperture 42 into the spoon. It is important that the exit of the aperture 42 should not be submerged in the body of liquid in the spoon for then liquid expelled with each squeezing of the tubular handle 14 would be inspirated or drawn back into the tubular handle 14 upon release thereof.

Second, the aperture 28 is desirably located close to the bottom of the tubular handle 14 when the apertures 28 and 42 are in registry (FIG. 5) and the plane of the lip 55 is substantially horizontal. This facilitates expulsion of all the liquid from the tubular handle.

Third, the tubular handle 14 is positioned at a slight angle relative to the spoon portion. In this connection it is desirable that the central longitudinal axis of the tubular handle 14 be at an angle of about 175–170° with reference to the plane of the lip 55 of the spoon portion. This disposes the tubular handle 14 at an angle when the lip 55 is horizontal so that the last increment of liquid drains toward the opening 28 and keeps the latter submerged until the end of the expulsion.

The plastic used in the manufacture of the tubular handle 14 may be relatively thick, say from .03 to .035 inch thick. With the use of such relatively thick material the liquid is expelled from the tube by repeated slight squeezes or depressions rather than by a complete collapse of the tube that would make holding tedious and make it difficult to discharge the last increment of the liquid. In this connection the elements of the device provide what in effect is a valveless pump, the inlet end of the aperture 28 remaining submerged and the exit end of the aperture 42 remaining open to the spoon during incremental expulsion of liquid resulting even from a slight squeezing of the tubular handle 14. When this squeezing pressure is released the exit end of the aperture 42 remains open to the atmosphere and air is drawn rearwardly into the interior of the tubular handle through the aligned apertures 42 and 28 in amount corresponding to the incremental volume of liquid expelled. This inspirated air bubbles upward through the remaining liquid in the tubular handle and collects as a cushion thereabove preparatory to a subsequent incremental expulsion. The liquid in the tubular handle can thus be pumped incrementally into the spoon to any level desired.

The device of FIGS. 1 and 2 is conveniently and sanitarily packaged in a sealed transparent container 56 as illustrated in FIGS. 11 and 12. With this arrangement the container 56 may be torn as suggested in FIG. 11, the spoon member 12 remaining within the container to be grasped by the hand without actually touching the spoon proper. In this position the operator grasps the tubular handle or the knurled surface of the binding ring 48 and relatively turns the elements into open position preparatory to dispensing the contained liquid into the spoon portion.

As earlier mentioned the tubular handle and its partition or diaphragm 18 are desirably made of a relatively flexible material such as polyethylene, whereas the spoon member 12 including its supporting structure 30 is preferably formed of a relatively rigid material such as polystyrene. With the selection of two such materials, it has been found that sealing of the tube is enhanced with squeezing pressure applied to the flexible tubular handle when the device is in its closed position. Increased internal pressure displaces the diaphragm 18 into pressural engagement with the rear face 32, forming a still more effective seal with the relatively rigid material of the spoon member upon application of such pressure.

The device of FIGS. 9 and 10 is similar to that illustrated in FIG. 1 differing only in that the tubular handle portion 62 is oversized to hold several spoon-filling doses, whereas the device of FIG. 1 is normally formed to hold a single dose, normally a teaspoonful. The device of FIG. 9 has a spoon member 64 rotatably held in a neck portion 65 of the tubular handle 62, this neck portion here providing the socket means as previously described. As before there is provided a binding ring 66 for securing the tubular handle 62 to a head 67 of the spoon member. The dispensing device of FIGS. 9 and 10 may be provided with a rigid plastic closure 68 which is slidably held by a reduced-diameter portion 69 of the tubular handle 62.

The device illustrated in FIGS. 13–18 differs from the other two embodiments in having an integrated structure formed entirely of a pliable plastic material, preferably polyethylene. This structure is less expensive to manufacture and, as illustrated, is made up of a squeezable tubular handle 70 set at a slight angle to a spoon member 72. The outer end of the tubular handle is preferably closed by collapsing the plastic tube as illustrated and as previously described. The tubular handle 70 at its spoon end is closed by a forward wall 76 which at its lower side carries an aperture 78. The relative position of the aperture 78 to the spoon member 72 is best seen in FIGS. 15 and 17. The aperture 78 is removably closed by a plug 80 which is carried between the ends of an integrally-formed flexible strap 82 having an end portion 83 which extends sidewardly beyond the tubular handle 70 when the plug 80 closes the aperture 78. The plug is preferably on the under side of the strap when the latter is in its straight position shown in FIG. 16. It is important to the instant structure that the aperture 78 open into the spoon above the plane to which the spoon is filled, otherwise with release of pressure on the tubular handle 70 liquid will return through the aperture into the handle proper.

Although an exemplary embodiment of the invention has been disclosed herein for purposes of illustration, it will be understood that various changes, modifications, and substitutions may be incorporated in such embodiment without departing from the spirit of the invention as defined by the claims which follow.

What is claimed is:

1. A liquid dispensing device comprising: a spoon; a squeezable tubular handle formed of pliable plastic material supporting said spoon, said tubular handle having an aperture at the spoon end opening into the spoon above the plane to which the spoon is filled with the spoon in its substantially horizontal filling position, said aperture being in a plane above the plane of the spoon edge; and means for closing and opening the aperture.

2. A liquid dispensing device comprising: a spoon member; a flexible plastic tubular handle; means for rotatably supporting said spoon member at one end of said tubular handle, said tubular handle providing an aperture for discharging a liquid from the tubular handle into the spoon member upon squeezing of the plastic handle, said aperture opening into the spoon member above the plane to which the spoon is filled with the spoon in its substantially horizontal filling position said aperture being in a plane above the plane of the spoon edge, and means for opening and closing the aperture upon relative rotation of said spoon member and said tubular handle.

3. A liquid dispensing device comprising: a pliable plastic tubular handle closed at one end; a partition closing the other end of said tubular handle and providing a small aperture therethrough; walls forming an inwardly facing arcuate groove adjacent the forward outside face of said partition; and a spoon member having at its rear end a supporting structure for attaching the spoon member to the plastic tube, said structure including a circular wall sized to be insertable into said arcuate groove upon deformation of said walls thereof to dispose a rear face of said circular wall in abutting relation with the front outside face of said partition, said groove-forming walls then encircling said circular wall, said circular wall providing a second aperture registerable with said small aperture and discharging into said spoon member in a plane above the plane of the spoon edge and with said tubular handle providing a circumferential channel extending rearwardly of said forward face of said partition, said circular wall providing a circular lip extending into said recessed circumferential channel.

4. A liquid dispensing device comprising: a pliable plastic tubular handle closed at one end and adapted to contain a liquid to be dispensed; a spoon member at the other end of said tubular handle, said spoon member providing a spoon portion having an upper lip lying in a plane disposed at a small angle with respect to the longitudinal axis of said tubular handle and a wall means separating the interior of said tubular handle from said spoon portion, said wall means having an aperture means communicating at its inner end with the lower interior of said tubular handle when said plane of said upper lip is substantially horizontal, said aperture means having an outer end opening to said spoon portion at a level above said plane of said upper lip, said tubular handle, spoon member and said wall means all being molded integrally of the same pliable plastic, and closure means for said aperture means comprising a flexible strap having one end molded integrally with the remainder of said liquid dispensing device and a plug on said flexible strap sized to enter and close said outer end of said aperture means.

5. A liquid dispensing device comprising: a plastic spoon; a squeezable tubular handle integrally formed with said spoon and of the same pliable plastic material, said tubular handle having an aperture at the spoon end opening into the spoon above the plane to which the spoon is filled with the spoon in its substantially horizontal filling position, said aperture being in a plane above the plane of the spoon edge; and means for closing and opening the aperture, said means comprising a plug carried by a flexible strap made of the same plastic material as and formed integrally with the rest of the structure.

6. A liquid dispensing device comprising: a pliable plastic tubular handle closed at one end; a partition closing the other end of said tubular handle and providing a small aperture therethrough; walls forming an inwardly facing arcuate groove adjacent the forward outside face of said partition; a spoon member having at its rear end a supporting structure for attaching the spoon member to the plastic tube, said structure including a circular wall sized to be insertable into said arcuate groove upon deformation of said walls thereof to dispose a rear face of said circular wall in abutting relation with the front outside face of said partition, said groove-forming walls then encircling said circular wall, said circular wall providing a second aperture registerable with said small aperture and discharging into said spoon member; and a binding ring holding the tubular handle in tight engagement against the encircled supporting structure of the spoon member.

7. A liquid dispensing device comprising: a pliable plastic tubular handle closed at one end and adapted to contain a liquid, said tubular handle providing a socket means at its other end; a partition closing said tubular handle at a position between said ends, said partition providing a small aperture therethrough opening on the forward face thereof, said forward face bounding said socket means; and a spoon member having at its rear end a supporting structure rotatable in said socket means, said supporting structure providing a rear face in abutting relation with said forward face and providing a second aperture therethrough registerable with said small aperture of said partition upon relative rotation of said spoon member and said tubular handle, said aperture when in register are at a position spaced radially from the axis of relative rotation of said spoon member and said tubular handle, and including a dimple-like projection on said rear face spaced an equal radial distance from said axis but spaced arcuately from said second aperture to enter said small aperture of said partition upon relative rotation of said spoon member and said tubular handle.

References Cited in the file of this patent
UNITED STATES PATENTS

| | | |
|---|---|---|
| 520,593 | Hager | May 29, 1894 |
| 1,773,820 | Lysons | Aug. 26, 1930 |
| 2,226,663 | Hill et al. | Dec. 31, 1940 |
| 2,252,119 | Edmonds | Aug. 12, 1941 |
| 2,276,641 | Ball | Mar. 17, 1942 |
| 2,837,822 | Wille | June 10, 1958 |
| 2,838,211 | Piker | June 10, 1958 |
| 2,953,170 | Bush | Sept. 20, 1960 |